(12) United States Patent
Rohles et al.

(10) Patent No.: US 6,980,816 B2
(45) Date of Patent: Dec. 27, 2005

(54) CONTEXTUAL INFORMATION MANAGEMENT IN WIRELESS COMMUNICATIONS DEVICES AND METHODS THEREFOR

(75) Inventors: Frederick Rohles, Hoffman Estates, IL (US); Venugopal Vasudevan, Palatine, IL (US); Joseph F. Wodka, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 314 days.

(21) Appl. No.: 10/304,650

(22) Filed: Nov. 26, 2002

(65) Prior Publication Data

US 2004/0203886 A1 Oct. 14, 2004

(51) Int. Cl.$^7$ .......................... H04Q 7/20; H04M 1/00; H04B 7/00
(52) U.S. Cl. ................. 455/456.1; 455/456.2; 455/456.3; 455/456.6; 455/550.1; 455/41.2
(58) Field of Search .................... 455/404.2, 412.1, 455/456.1, 456.2, 456.3, 456.5, 456.6, 457, 459, 41.2, 418, 419, 524, 525, 530.1; 340/539.1, 539.12, 539.22, 539.23, 539.26, 539.13; 349/989–994; 709/201–203

(56) References Cited

U.S. PATENT DOCUMENTS

| | | | |
|---|---|---|---|
| 5,594,947 A | * | 1/1997 | Grube et al. ................. 455/509 |
| 6,031,455 A | | 2/2000 | Grube et al. |
| 6,049,711 A | * | 4/2000 | Ben-Yehezkel et al. ... 455/414.3 |
| 6,157,841 A | * | 12/2000 | Bolduc et al. ........... 455/456.5 |
| 6,259,405 B1 | | 7/2001 | Stewart et al. |
| 6,356,761 B1 | | 3/2002 | Huttunen et al. |
| 6,750,883 B1 | * | 6/2004 | Parupudi et al. ............. 345/763 |
| 2002/0002034 A1 | | 1/2002 | Davies et al. |
| 2002/0040398 A1 | * | 4/2002 | Nguyen ...................... 709/227 |
| 2002/0072347 A1 | * | 6/2002 | Dunko et al. ............... 455/404 |
| 2002/0077060 A1 | | 6/2002 | Lehikoinen et al. |
| 2002/0094074 A1 | | 7/2002 | Lurie |
| 2002/0133545 A1 | * | 9/2002 | Fano et al. .................. 709/203 |
| 2002/0137523 A1 | * | 9/2002 | Diggelen ..................... 455/456 |
| 2002/0165910 A1 | * | 11/2002 | Brown et al. ............... 709/203 |
| 2002/0178022 A1 | * | 11/2002 | Anderson et al. .............. 705/1 |
| 2003/0018692 A1 | * | 1/2003 | Ebling et al. ................ 709/108 |
| 2003/0120530 A1 | * | 6/2003 | Casati et al. ................... 705/8 |
| 2003/0135498 A1 | * | 7/2003 | Bodin et al. ................... 707/4 |
| 2003/0135582 A1 | * | 7/2003 | Allen et al. .................. 709/217 |
| 2003/0148773 A1 | * | 8/2003 | Spriestersbach et al. .... 455/456 |
| 2003/0187838 A1 | * | 10/2003 | Deleeuw ........................ 707/3 |
| 2004/0043756 A1 | * | 3/2004 | Haukka et al. ............. 455/411 |
| 2004/0090121 A1 | * | 5/2004 | Simonds et al. ........... 307/10.1 |

OTHER PUBLICATIONS

Richard Moe Gustavsen, "Condor—an application framework for mobility–based context–aware applications", UBICOMP 2003 workshop, Sep. 29, 2002, 6 pages.

Siemens, Context–Aware Services for Units Networks, pp. 1–15.

* cited by examiner

*Primary Examiner*—William Trost
*Assistant Examiner*—Meless Zewdu
(74) *Attorney, Agent, or Firm*—Roland K. Bowler, II

(57) ABSTRACT

A method in a wireless communication device including requesting contextual information from a source outside the wireless communication device, the contextual information requested by a context aware application on the wireless communications device, and providing alternate contextual information to the context aware application with a contextual information discriminator of the wireless communications device when contextual information from the source from which contextual information is requested is not available.

17 Claims, 5 Drawing Sheets

_US 6,980,816 B2_

CONTEXTUAL INFORMATION MANAGEMENT IN WIRELESS COMMUNICATIONS DEVICES AND METHODS THEREFOR

FIELD OF THE DISCLOSURE

The present disclosure relates generally to wireless communication, and more particularly to the management of contextual information from context aware sources in wireless communication devices and in wireless communication networks and methods therefor.

BACKGROUND

Communication networks are being populated increasingly with context aware information sources capable of providing contextual information and services including, for example, location-based information and services for mobile wireless communication devices. Discontinuities in the availability of context aware information, however, poses difficulties for context aware applications that rely upon contextual information, for example, context aware applications running on mobile wireless communication devices.

Regional discontinuities of contextual information may result, for example, from environments populated only partially with contextual information sources, typical of developing network infrastructures. Discontinuities may also arise from the occasional failure or interruption in the provision of contextual information.

The various aspects, features and advantages of the present disclosure will become more fully apparent to those having ordinary skill in the art upon careful consideration of the following Detailed Description with the accompanying drawings described below.

DETAILED DESCRIPTION

Figure 1:
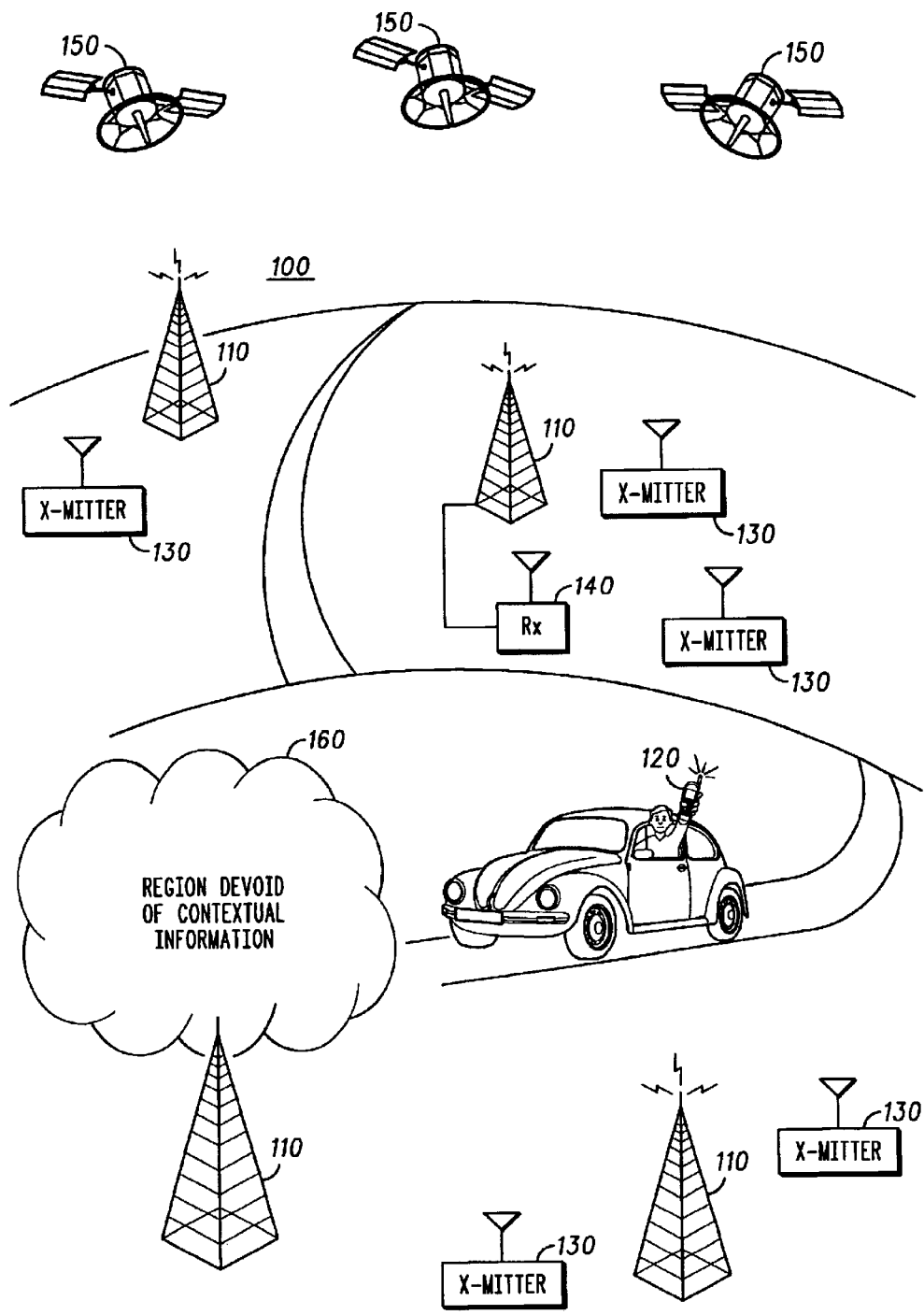
FIG. 1 is an exemplary wireless communication network at least partially populated with contextual information transmitters.

In FIG. 1, an exemplary wireless communication network 100 includes a plurality of base stations 110 and other known network infrastructure, which is known generally but not illustrated, enabling mobile wireless communication devices, for example, device 120, to communicate with one another within and beyond the network.

In FIG. 1, the network also includes contextual information sources, including satellite based information (150) sources and terrestrial based contextual information sources (130). Generally, the contextual information sources provide contextual information or form the basis for providing contextual information, which is used by mobile wireless communication devices, for example, by context aware applications and by other programs running thereon.

Exemplary terrestrial contextual information sources include, for example, information transmitters that populate buildings and other environments. These information transmitters provide contextual Information, for example, location based information, like altitude, building floor number, navigation information, etc. The information transmitters may also provide information based on a sensed local condition, like temperature, precipitation, traffic conditions, etc. The transmitters may be isolated or linked. More generally, the transmitters provide any contextual information, static or dynamic, based on sensed conditions or otherwise.

In some embodiments, the transmitters are radio transmitters, for example, Bluetooth transmitters, that transmit contextual information directly to mobile wireless communication devices. The transmitters are not necessarily part of the communication network infrastructure, although they may be. The transmitters may thus be provided and managed by any party. Generally, the contextual information transmitters may constitute a network or networks of transmitters.

In other embodiments, the transmitters or networks of transmitters communicate contextual information to the mobile wireless communication devices indirectly via the wireless communication network. In FIG. 1, for example, a contextual information receiver 140 relays received contextual information to mobile devices via the network infrastructure, for example, base station 110, as discussed more fully below. In the latter example, the contextual information may be provided to network operators gratuitously or for a fee.

In some communication networks, location determining infrastructure is used to determine the location of mobile communication devices, the location of which may be used as a basis for providing contextual location-based information or other services via the wireless communication network infrastructure. Exemplary location determining infrastructure includes satellites of the NAVSTAR Global Positioning System (GPS), Glonass and other satellite constellations, some of which may be used primarily for communications. Generally, the satellites 150 in FIG. 1 may be those of a location based or communications constellation, either of which provides or forms the basis for providing contextual information. In other embodiments, buildings and other physical infrastructure may be equipped with beacons that transmit higher-level metadata, for example, the building's address, which can then be translated to a geographical coordinate, for example, by an address-to-GPS converter web-based service.

Location determining infrastructure also includes terrestrial based locating infrastructure, which may include elements of the wireless communication infrastructure, for example, base stations, location measurement units (LMUs), etc., which are used for determining location based on estimated observed time of arrival (E-OTD), angle of arrival (AOA), among other terrestrial locating schemes.

Figure 2:
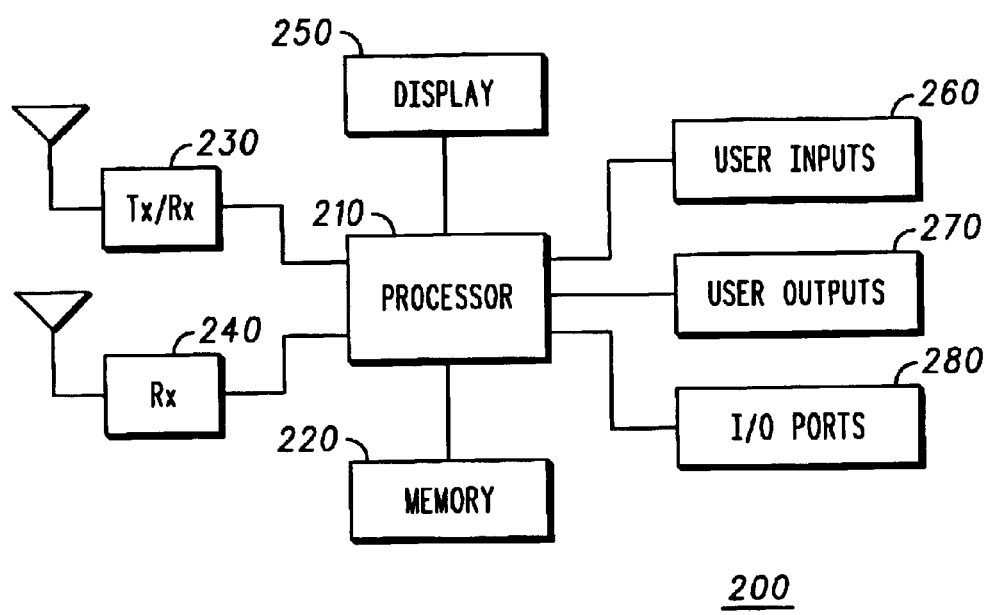
FIG. 2 is a block diagram of an exemplary mobile wireless communication device.

FIG. 2 is a schematic block diagram of an exemplary mobile wireless communications device 200 comprising generally a processor 210 coupled to memory (220), for example, RAM, ROM and firmware, among other memory devices. Applications and other processor executable programs and code are stored in memory.

The exemplary wireless communication device also comprises a transceiver 230, although other devices do not include a transceiver. Wireless communication devices comprising a transceiver include, for example, cellular communication handsets, transceiver equipped personal digital assistants (PDAs) and laptop computers, among other devices. In devices including a transceiver, contextual information may be received by the transceiver of the wireless communication device, for example, via a cellular communication network, as discussed above.

In other embodiments, the wireless communication device 200 includes a receiver 240, for example, a satellite positioning system receiver or a Bluetooth or 802.11b receiver or some other contextual information receiver. The receiver 240 may be in addition to the transceiver receiver 230 discussed above, although in some embodiments the wireless communication device includes the receiver 240 without a transceiver. Exemplary wireless communication devices having only a receiver without transmitter capability include, for example, personal digital assistants (PDAs) and laptop computers, among other wireless communication devices that receive but do not transmit.

The exemplary wireless communication device 200 also comprises a display 250, user-inputs 260, for example, an alphanumeric keypad and/or other input devices, possibly a microphone, etc., which are coupled to the processor. User outputs 270, for example, a speaker, and input/output ports 280 are also coupled to the processor. Not all wireless communication devices however include all of these exemplary features.

FIG. 1 illustrates a region 160 that is devoid of contextual information transmitters or at least experiences a temporary interruption in the availability of contextual information. The region may be as large as an expansive geographical area or as small as an area within a building, for example, in an elevator carriage. Also, the region 160 is not necessarily within an area having cellular communications coverage, as illustrated in the exemplary embodiment of FIG. 1.

The lack of contextual information availability in region 160 may be for any reason, including temporary interruptions of in the service of providing contextual information, or for lack of population of the region with means for making the contextual information available.

Mobile wireless communication devices traveling through the region 160 devoid of contextual information will experience a discontinuity in the availability of contextual information, which may be used or relied upon by the device, for example, by software applications and other computer code on the device. An interruption in the availability of the contextual information during execution of the software or code or when requested by the device is generally undesirable.

According to one aspect of the invention, generally, alternate contextual information is provided to the device, for example, to a context aware application running thereon, when contextual information from the source from which contextual information is required or requested by the wireless communication device is not available.

In situations where there is an interruption of contextual information, detection of the interruption may be used to initiate a search for alternate contextual data. In one embodiment, a context dispatcher entity detects the interruption of primary context information flow, and triggers the search for an alternate context information source, for example, by communicating the interruption or data unavailability to the discriminator. Alternatively, the discriminator may detect interruptions in the contextual information.

In one embodiment, a contextual information discriminator monitors the availability of the contextual information used or required and in some embodiments the contextual information used or requested by the wireless communications device. The contextual information discriminator is thus aware of contextual information in its environment, and is capable of providing alternative information if the information requested or used is unavailable, or based upon some condition other than unavailability.

The contextual information discriminator is preferably implemented in software. In some embodiments, the contextual information discriminator resides in memory on the wireless communication device. In other embodiments, for example, those where contextual information is communicated to the wireless communication device via a communication network, the contextual information discriminator resides in the network.

Figure 3:
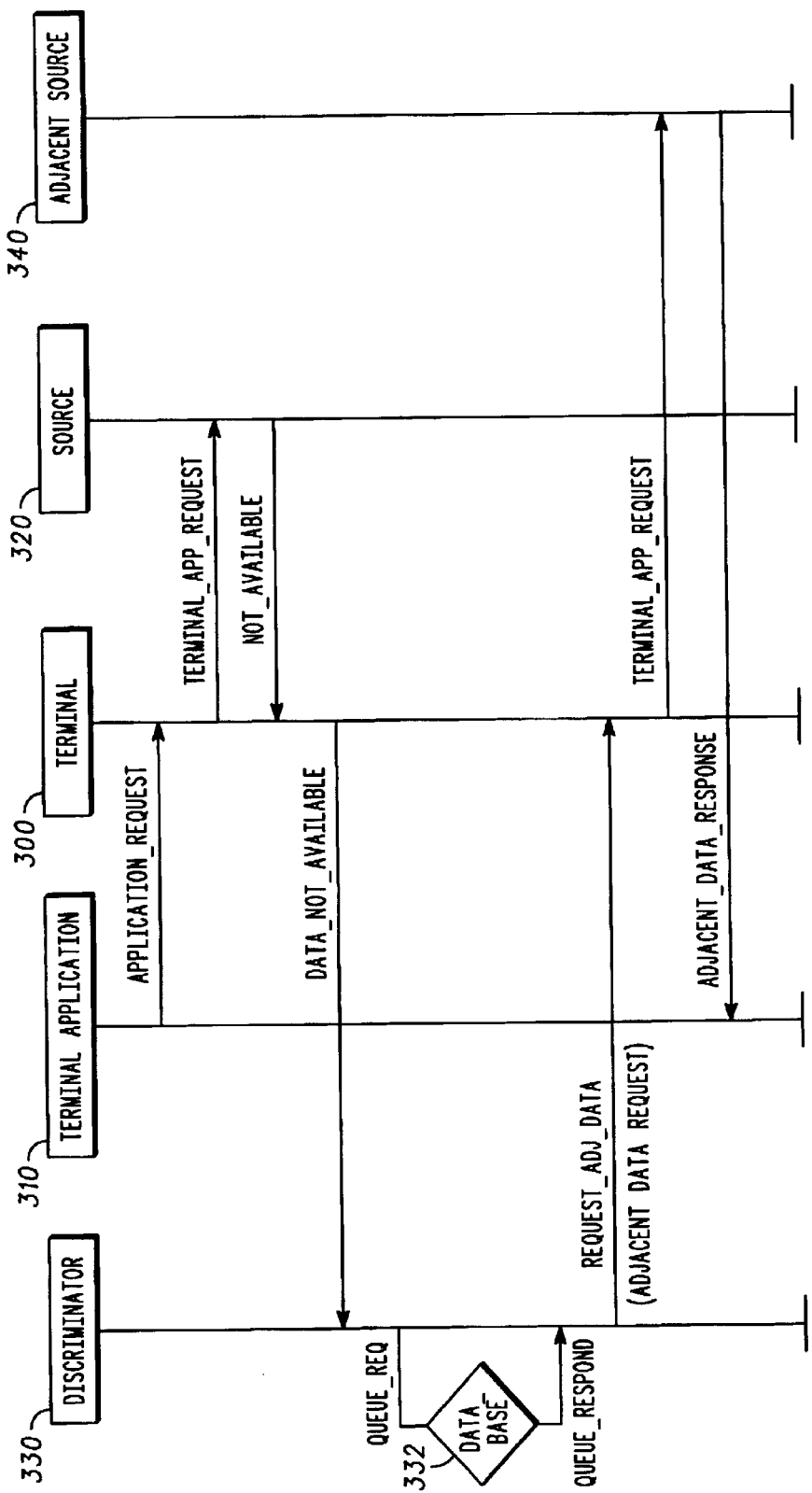
FIG. 3 is an exemplary communication diagram for providing alternate contextual information to a wireless communication device.

In one mode of operation, alternative contextual information is provided to a wireless communication device, or terminal, by providing contextual information from a source different than the source from which contextual information is requested. In FIG. 3, for example, a terminal 300 includes an application 310 running thereon. The terminal uses or requests contextual data from a first source 320, for example, a particular type of contextual data or data from a particular location. The contextual information discriminator 330 monitors the availability of the information used or requested, either directly or via communications from the terminal as illustrated in FIG. 3. In some embodiments, the discriminator may also monitor requests for data made by the application 310.

In FIG. 3, where the contextual information requested is unavailable, as communicated by the terminal 300 to the discriminator 330, the discriminator 330 requests data from an alternate source, for example, from an adjacent contextual information source. The contextual information required or requested may be unavailable, for example, because the source 320 is temporarily incapacitated or because the source 320 is non-existent. In the exemplary embodiment of FIG. 3, the discriminator prompts the alternate source to provide alternate contextual information to the application.

Figure 4:
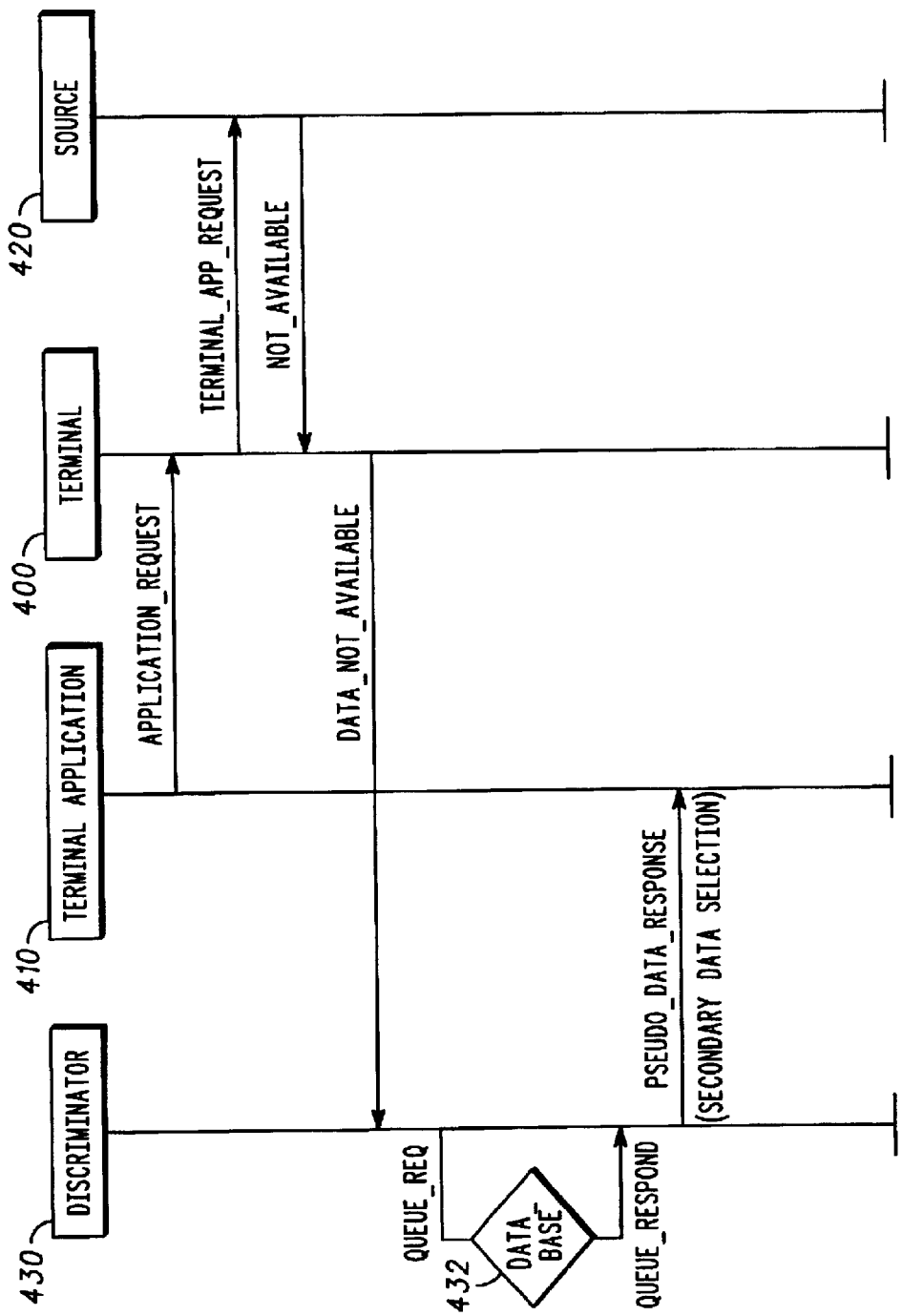
FIG. 4 is an exemplary communication diagram for providing alternate contextual information to a wireless communication device.

In FIG. 4, the contextual information discriminator includes a database 432 of contextual information sources, thereby providing the discriminator with means for selecting an alternate contextual data source. The database may thus be used by the discriminator 430 to select the most appropriate alternate or secondary information to provide to the application 410, for example, by selecting an alternate contextual information source nearest the wireless communication device.

In some modes of operation, contextual information from two or more alternate sources is combined to form composite contextual information, which is provided to the device. The composite information may be an average of information from sources adjacent to a source or location from which information is unavailable, or the composite may be based upon an interpolation or an extrapolation of available contextual information.

The contextual information discriminator provides the alternate contextual information to the terminal. In some modes of operation, the alternate data may be some information provided to the application previously from the same source. This information may have been stored or buffered, either on the wireless communication device or in a network with which the device communicates, and then provided to the application in response to instructions from the discriminator.

Figure 5:
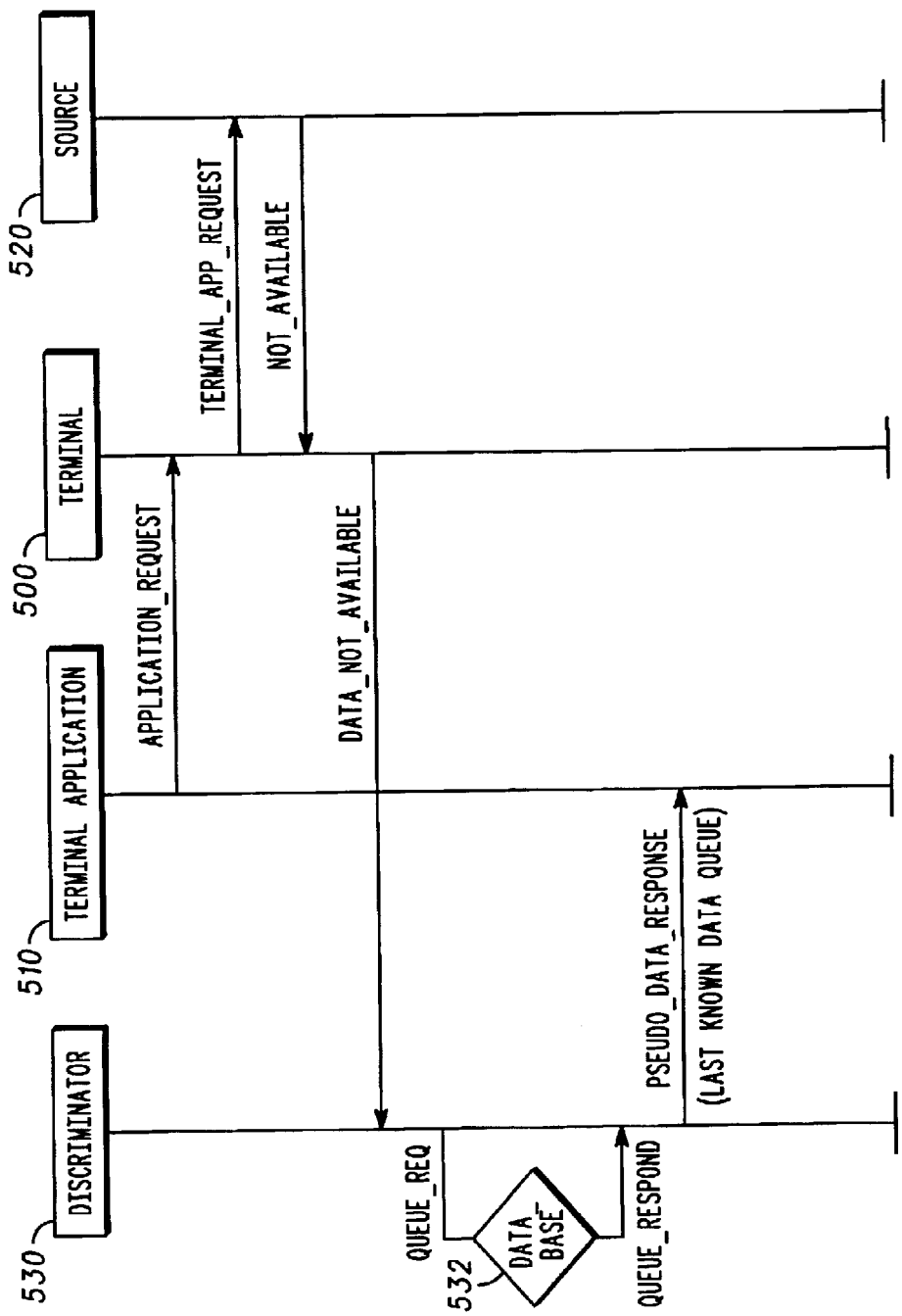
FIG. 5 is an exemplary communication diagram for providing alternate contextual information to a wireless communication device.

In the exemplary embodiment of FIG. 5, the contextual information discriminator 530 provides the last known contextual information to the application 510. As discussed above, the alternate last known contextual information may be stored in memory for this purpose.

More generally, contextual information from a source located off the wireless communication device is provided to the wireless communication device, for example, to program code thereon, in response to requests via a contextual information discriminator. The contextual information discriminator determines generally what contextual information is best suited for the application in response to the request, for example, based on the database or based on some other information, and then either provides the information selected or prompts the providing of the information, or otherwise indicates to the device where to obtain the information.

In architectures where the discriminator is located in the network, the network generally receives, from a wireless communication device, a request for contextual information from a contextual information source located in the wireless communication network. In response, the network provides contextual information via the contextual information discriminator located within the network to the wireless communication device.

As noted above, in some embodiments, the contextual information discriminator monitors contextual information available from sources in the wireless communication network with the contextual information discriminator. Alternatively, the contextual information discriminator may provide contextual information when prompted by the application for alternate information.

While the present disclosure and what are considered presently to be the best modes thereof have been described in a manner that establishes possession thereof by the inventors and that enables those of ordinary skill in the art to make and use the same, it will be understood and appreciated that there are many equivalents to the exemplary embodiments disclosed herein and that myriad modifications and variations may be made thereto without departing from the scope and spirit of the disclosure, which is to be limited not by the exemplary embodiments but by the claims appended hereto.

What is claimed is:

1. A method in a wireless communication device, comprising:
   requesting contextual information from a source outside the wireless communication device,
   the contextual information requested by a context aware application on the wireless communication device;
   providing alternate contextual information to the context aware application with a contextual information discriminator of the wireless communication device when contextual information from the source from which contextual information is requested is not available.

2. The method of claim 1, monitoring contextual information requests and monitoring contextual information received with the contextual information discriminator.

3. The method of claim 1, detecting an interruption of the contextual information requested, and providing alternate contextual information in response to the interruption.

4. The method of claim 1, providing alternate contextual information to the context aware application by providing contextual information from a source different than the source from which contextual information is requested.

5. The method of claim 1, providing alternate contextual information to the context aware application by providing contextual information from a last known source other than the source from which contextual information is requested.

6. The method of claim 1, providing alternate contextual information to the context aware application by providing contextual information from a source adjacent to the source from which contextual information is requested.

7. The method of claim 1, providing alternate contextual information to the context aware application by providing composite contextual information from at least two sources of contextual information other than the source from which contextual information is requested.

8. A method in a wireless communication device, comprising:
   requesting contextual information from a contextual information source,
   the contextual information source located off the wireless communication device,
   providing contextual information to the wireless communication device in response to the request via a contextual information discriminator, the contextual information being at least one of
      from a source other than the source from which contextual information is requested,
      from a source adjacent to the source from which contextual information is requested in response to the request, and
      from at least two sources other than the source from which contextual information is requested in response to the request.

9. The method of claim 8, requesting contextual information by a context aware application on the wireless communication device.

10. The method of claim 8, providing contextual information to the wireless communications device via a contextual information discriminator located on the wireless communication device.

11. A method in a wireless communication network, comprising:
   receiving a request for contextual information from a contextual information source located in the wireless communication network,
   the request received from a wireless communication device in the wireless communication network;
   providing contextual information via a contextual information discriminator located within the wireless communication network in response to the request,
   the contextual information discriminator capable of selecting an alternate contextual information source in the event that the source from which contextual information is requested is unavailable.

12. The method of claim 11, providing contextual information from a source other than the source from which contextual information is requested in response to the request.

13. The method of claim 11, providing older contextual information from the source from which contextual information is requested when newer contextual information from the source from which contextual information is requested is not available.

14. The method of claim 11, providing contextual information from a source adjacent to the source from which contextual information is requested in response to the request.

15. The method of claim 11, providing composite contextual information from at least two sources other than the source from which contextual information is requested in response to the request.

16. The method of claim 11, monitoring contextual information available from sources in the wireless communication network with the contextual information discriminator.

17. The method of claim 11, monitoring contextual information requests from wireless communication devices, providing contextual information in response to requests for contextual information based upon contextual information available from sources in the wireless communication network.

* * * * *